(12) United States Patent
Stave

(10) Patent No.: US 9,484,976 B2
(45) Date of Patent: Nov. 1, 2016

(54) ASSEMBLY COMPRISING TWO ANTENNAS CONTROLLABLE TO OUTPUT OR NOT OUTPUT SIGNALS

(75) Inventor: Svend Stave, Fredensborg (DK)

(73) Assignee: Thrane & Thrane A/S, Kgs. Lyngby (DK)

( * ) Notice: Subject to any disclaimer, the term of this patent is extended or adjusted under 35 U.S.C. 154(b) by 0 days.

(21) Appl. No.: 14/414,405

(22) PCT Filed: Jul. 13, 2012

(86) PCT No.: PCT/EP2012/063849
§ 371 (c)(1),
(2), (4) Date: Jan. 12, 2015

(87) PCT Pub. No.: WO2014/008952
PCT Pub. Date: Jan. 16, 2014

(65) Prior Publication Data
US 2015/0200701 A1    Jul. 16, 2015

(51) Int. Cl.
| | |
|---|---|
| H04B 1/44 | (2006.01) |
| H04B 1/401 | (2015.01) |
| H01Q 3/20 | (2006.01) |
| H04B 7/08 | (2006.01) |
| H04B 7/04 | (2006.01) |

(52) U.S. Cl.
CPC ............. H04B 1/401 (2013.01); H01Q 3/20 (2013.01); H04B 1/44 (2013.01); H04B 7/0404 (2013.01); H04B 7/0868 (2013.01)

(58) Field of Classification Search
CPC .......... H04B 1/48; H04B 1/401; H04B 1/44; H04B 1/54; H04B 1/56; H04B 1/58
USPC .................................................. 455/78, 84
See application file for complete search history.

(56) References Cited

U.S. PATENT DOCUMENTS

| | | | |
|---|---|---|---|
| 6,262,689 B1 | 7/2001 | Yamamoto et al. | |
| 7,508,342 B2 | 3/2009 | Nelson | |
| 7,570,949 B1 | 8/2009 | Minerath | |
| 2005/0245224 A1 | 11/2005 | Kurioka | |
| 2008/0111741 A1* | 5/2008 | Lee | G01S 19/37 342/383 |

FOREIGN PATENT DOCUMENTS

| | | |
|---|---|---|
| EP | 0930669 A2 | 7/1999 |
| EP | 1562309 A2 | 8/2005 |

OTHER PUBLICATIONS

"AN/WSC-8(V) navy shipboard terminal (United States), Satellite sytems and equipment", Janes Military Communications, May 2012, pp. 1-2.
"Jotron 8120 Dual", Blockade free operation, Jortron, p. 1. Prior to Jul. 13, 2012.
"Dual Antenna Switch", acutec sytem Marine Satellite, 1 page. Prior to Jul. 13, 2012.
E. Barry Felstead, "Optimum Combining of Multiple Shipboard Satcom Antennas for Hemispheric Coverage", Communications Research Centre, 2000 IEEE, pp. 604-608.
International Search Report PCT/ISA/210 for International Application No. PCT/EP2012/063849 Dated Jul. 13, 2012.
Written Opinion of the International Searching Authority PCT/ISA/237 for International Application No. PCT/EP2012/063849 Dated Jul. 13, 2012.

* cited by examiner

*Primary Examiner* — Nay A Maung
*Assistant Examiner* — Angelica M Perez
(74) *Attorney, Agent, or Firm* — Harness, Dickey & Pierce, P.L.C.

(57) ABSTRACT

An assembly, a method of operating the assembly and antennas for use in the assembly, where two or more antennas (16, 18) each is adapted to output an output signal with one of two or more characteristics, only one antenna outputting a signal with a predetermined characteristic, such as a non-zero amplitude, whereby the output signals from the antennas may simply be added/summed while enabling selection of the signal with the predetermined characteristic using e.g. a simple filter.

10 Claims, 1 Drawing Sheet

ASSEMBLY COMPRISING TWO ANTENNAS CONTROLLABLE TO OUTPUT OR NOT OUTPUT SIGNALS

Figure 1:
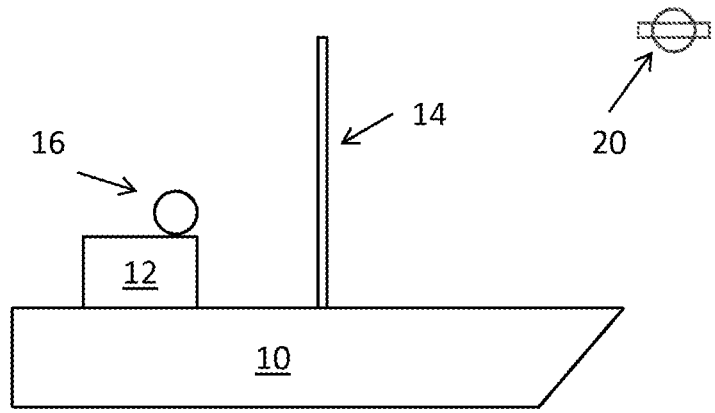

This application is the national phase under 35 U.S.C. §371 of PCT International Application No. PCT/EP2012/063849 which has an International filing date of Jul. 13, 2012.

The present invention relates to an assembly comprising at least two antennas and which are adapted to receive a signal from a signal provider/receiver and which are each adapted to output an output signal with different characteristics so that a simple combination of the signals of the antennas may be performed at a receiver.

Systems with multiple antennas may be seen in U.S. Pat. Nos. 7,570,949 and 7,508,342 as well as "Optimum combining of multiple shipboard satcom . . ." by E. Barry Felstead, Communications Research Centre, Ottawa, Canada, IEEE, 2000 (MILCOM 2000. 21st Century Military Communications Conference Proceedings, Issue Date: 2000, page(s): 604-608 vol. 2, http://www.acutec.com.au/dual-antenna-switch.aspx, http://www.jotron.com/ai_files/jotron_b120_dual_514224.pdf and http://articles.janes.com/articles/Janes-Military-Communications/AN-WSC-8V-navy-shipboard-terminal-United-States.html.

A first aspect of the invention relates to an assembly according to claim 1.

In this context, an assembly may be divided up into any number of elements. In a preferred embodiment, the antennas are individual elements, usually each provided in a single housing, and the combining unit and the mode controller may be provided in a single housing or multiple housings.

In some embodiments, it is desired that the mode controller is positioned within an antenna or even distributed in the antennas so that each antenna has a mode controller, where the mode controllers communicate directly or via e.g. a third, external mode controller. The mode controller of an antenna then controls the signal converter of that antenna and may output instructions to other mode controllers to control these or receive instructions from other mode controllers to be controlled thereby.

Even though any type of antenna may be used, such as an antenna used for receiving radio signals, TV signals, cell phone signals, or the like, preferably, the antennas are tracking antennas. A tracking antenna is antenna which may track a signal provider and/or signal receiver. This tracking may be a physical tracking, such as an adaptation of an axis of the antenna, of a directional antenna, such as an antenna with one or more discs, or an electronic tracking using a stationary antenna set-up. An electronic tracking may be obtained by using multiple antennas and phase shift the signals transmitted thereto or signals received therefrom, as this phase shift may be equalled to an angle seen from an axis of the antennas.

The antenna may have signal re-directing elements, such as disc-shaped elements or elongate elements adapted to redirect the radiation and/or focus the radiation on the signal generator. This output signal may be generated on the basis of signals from a number of antenna elements, such as after phase shifting an output of one antenna element in relation to an output of another antenna element.

A signal generator of an antenna typically will comprise an element, such as one or more antenna elements, adapted to receive an incoming signal and output an output signal. The incoming signal usually is a wireless signal (such as a radio wave signal, or a signal having a carrier frequency in the interval of 300 MHz-100 GHz, such as in the GHz range, or at least in the interval of 10 GHz-15 GHz). For satellite receivers, the signal generator may also be called a Low Noise Block, LNB.

In a preferred embodiment, the signal generator is operable to receive an input signal and output a signal having at least substantially the same frequency contents or useful data as the input signal. The signal generator may be a signal converter converting the wireless signal into an electrical or optical signal which may be carried on another wavelength or be provided within another frequency interval, but the useful data therein is the same. This useful data may represent a data file, audio, video, an audio file, a video file, a file download or the like.

The first and second antennas may be identical or similar, such as adapted to communicate with the same type of signal provider/receiver, such as a satellite using a predetermined frequency band, or may be adapted to communicate with different types of signal provider/receivers.

Naturally, any number of antennas may be used.

In a preferred embodiment, the antennas are adapted to communicate with the same signal provider/receiver, so that the operation of the signal converters may be carried out depending on which of the first and second antenna has the best reception and/or lowest signal-to-noise communication with the signal provider/receiver.

In the present context, a signal output may be an element of an antenna where the output signal is available, such as a plug/connector or a cable connected to the antenna and through which the output signal is output. The output may be configured to output the output signal under or complying with any desired standard, if desired. Depending on the frequency of the signal, the output may be adapted to output an optical signal, an electrical signal or a wireless signal. An electrical signal may be output over an Ethernet cable, a coaxial cable or the like. If desired, multiple connectors/plugs and/or cables may be used for outputting the signal.

Naturally, the same plug/connector/cable/wireless antenna may be used for outputting further data or information from the antenna as well as receiving data or information for use in the antenna or for outputting therefrom.

The signal converter is configured to receive a signal output from the signal generator and convert this to have one characteristic of the plurality of characteristics. The signal converter is configured to convert the signal received to have any of the characteristics, so that the signal converter may shift between outputting the signal with one characteristic and another characteristic.

In this context, a characteristic may be a frequency of the signal, a frequency interval in which the signal is present, a maximum frequency of the signal, a minimum frequency of the signal, a maximum amplitude of the signal (such as zero, so that no signal is output), a minimum amplitude of the signal, an amplitude or amplitude interval of the signal, and/or a phase (minimum angle/shift, maximum angle/shift, angle/shift and/or angle/shift interval). Also, the characteristic may be an amplitude and/or a frequency modulation.

The individual characteristics are distinct, whereby no overlap exists between any pair of characteristics. Thus, one characteristic may be a maximum frequency/amplitude/phase, and another may be a minimum frequency/amplitude/phase, where the maximum value is lower than the minimum value. Yet another characteristic may be a value interval positioned between the maximum and minimum values of the two former characteristics. Then, any number of distinct characteristics may be used, such as 2, 3, 4, 5, 6, 8, 10 or more. In a preferred embodiment, 2 distinct characteristics are used.

The distinct characteristics have the advantage that the output signals may then simply be combined in the combining unit in a manner so that one signal may be divided out, or the other signals removed, due to the non-overlap of the characteristics. An amplitude or frequency modulated signal may be derived more or less as seen in radios and a frequency interval may be derived using a filter. An amplitude interval may be thresholded, and a phase interval identified using a filter.

The signal from the signal generator may have any properties or characteristics, as the signal converter will be able to bring its corresponding output signal to the correct characteristics. This conversion then may be a shift/conversion of frequency, amplitude and/or phase, or the like. This type of conversion is standard in the art. In general, the conversion preferably maintains the useful data of the signal.

The combining unit has signal inputs adapted to receive the signals output of the first and second antennas and combine these. This combination may be a continuous combination such as an electric combination of conductors from the inputs and the output. In a simple embodiment, the signal inputs are directly, galvanically, connected to each other and the output so that any signals received simultaneously on the two inputs would be overlaid on each other. This may be a simple T-connector between the output and the two inputs where each conductor of the first input is connected galvanically to a conductor or the other input and the output. An electric connection is a connection in which the signals flow, such as through electrical components (such as capacitors, coils, resistors, transistors and the like) from the input(s) to the output.

The combination of the input signals may be an addition of the signals, such as a real-time and constant addition/summation of the input signals.

It is noted that the summation of signals with different amplitudes, frequencies and/or phases is quite simple, in that such signals may be summed and transported on the same signal while it is possible to subsequently separate these using known filters.

The mode controller may be software controlled or hardwired or a combination thereof. The mode controller may be processor, DSP, computer, server, client, ASIC, FPGA or the like. The mode controller may be distributed or provided inside a single box or housing, as described above.

The controlling of the signal converters may take place by communicating with the signal converters, such as using wireless and/or wired communication. This communication path between the mode controller and an antenna, if the mode controller is positioned outside the antenna, may be used additionally for other purposes, such as for transporting signal quality data to the mode controller and/or direction data to the antenna. This will be described further below.

The mode controller is configured to control the first and second signal converters to have only one of the first and second output signals have the predetermined characteristic. Thus, only one of the antennas outputs a signal having that characteristic, whereas all (or the) other antenna(s) may output signals having the same or different characteristics, as long as this or these characteristic(s) is/are different from the predetermined characteristic.

In a preferred embodiment, the output of the combining element is connected to, using a wired and/or wireless connection, to a signal receiver, often called a modem, configured to perform a processing of the signal received from the combining element and output a processed signal, such as a signal comprising data. This processing may be a filtering, a downsampling, such as from a carrier frequency to base band, a de-coding, or a combination thereof. An advantage of the invention is seen in that only a single such processing is required, as it may be used, due to the operation of the signal converters and the combining element, for both antennas.

In general, this receiver/modem may select, such as using a filter, the output signal having the predetermined characteristic. This filtering may remove signals with all other characteristics. Thus, the operation of the signal converters will determine which antenna outputs an output signal which reaches or is used/selected by the receiver/modem.

Alternatively, the filter or selection may be performed in the combining unit.

The advantage thereof is that the selection/filtering may be fixed and thus very simple, as the signal converters in the antennas may be controlled so that the output signal from the desired antenna is actually selected.

In fact, a simple embodiment is one where one characteristic is a zero-amplitude so that only one antenna outputs a signal. The combination then becomes very simple.

In one embodiment, the first antenna comprises an element configured to receive a signal from the first signal generator and to determine a signal strength or a signal quality of a signal received by the signal generator, the element having a strength output configured to output a signal strength indication.

In this context, the element may determine the signal strength or the signal quality in a number of manners. The element may receive the signal also forwarded to the signal converter, i.e. the signal with the useful information, and may perform the determination from this signal. The element may alternatively receive a signal from the signal generator relating to a signal strength, a Signal-to-Noise-Ratio, a Bit Error Rate, or the like from the signal generator. Numerous manners exist of quantifying the signal strength and/or signal quality of a wireless signal, such as received from a satellite. The element may then quantify this signal quality/strength and output a corresponding signal strength indication on the strength output.

The signal strength required may depend on e.g. a carrier frequency and a coding regime used for encoding data in the signal. The signal quality may depend on external factors which scramble the signal, such as within the carrier frequency.

In a preferred embodiment, the mode controller is further configured to receive the signal strength indication from the strength output and control the first and second signal converters accordingly. In one situation, the mode controller may operate or control the signal converters so that the antenna having the highest signal strength is allowed to output the signal having the predetermined characteristic. This is especially interesting when the antennas are directed toward the same signal provider/receiver.

In the situation where the mode controller acts based on the signal strength indication, the mode controller, or at least a part thereof with sufficient functionality, may advantageously be positioned in the antenna having the element, so that this antenna autonomously may determine whether the signal quality/strength is sufficient and determine a characteristic of the output signal. This antenna may then output a signal to an external mode controller and/or the other antenna(s) and inform these accordingly, so that the signal converter(s) of the other antenna(s) is/are controlled accordingly.

This signal strength indication may be forwarded to the mode controller intermittently, constantly, or with a predetermined frequency, or it may be forwarded only when above a threshold, such as when the first signal converter converts the signal to the predetermined characteristic, or when the signal strength is below a predetermined threshold, such as when the signal converter converts the signal into another characteristic.

Alternatively, the signal strength indication may be output from the antenna and to the mode controller, which may then control the signal converters accordingly.

One reason for a reduction in signal strength may be an element blocking the line of sight from the antenna to the signal provider/receiver. If the antennas are provided in a dynamic environment, such as on a vehicle or vessel or where vehicles or vessels may move to a position between the antenna(s) and the signal provider/receiver, which may be a satellite, the line of sight between an antenna and the signal provider/receiver may vary.

Naturally, the antennas may be communicating with the same or different signal providers/receivers, and the signal strength(s) required to switch to another antenna may differ between the antennas or signal provider/receivers.

In one embodiment, the assembly further comprises a direction element operable to determine a first direction from the first antenna to a predetermined signal provider, wherein the direction element comprises information relating to one or more second directions and is operable to compare the first and second directions and to output direction information to the mode controller, which is configured to control the first signal converter on the basis of a result of the comparison. Alternatively, the comparison may be performed in the mode controller.

In one situation, the second directions are known or determined directions between the at least one antenna and one or more obstacles which may block the line of sight or signal transmission between the antenna and the signal provider. When the relative directions between the antenna, the signal provider and such obstacles vary, situations may exist where the obstacles move to a position between the antenna and the signal provider, where the first and second directions coincide, whereby the controller may operate to have the signal converter of that antenna output a signal not having the predetermined characteristic and the signal converter of another antenna output its signal with the predetermined characteristic. This other antenna may be an antenna for which a first direction is also determined and for which one or more second directions are known and in which no coinciding of a first and a second direction for that antenna exists.

In one situation, the antennas are provided on a vessel in which elements, such as masts, cranes, cabins, chimneys or the like are provided which may block the field of view between one or more of the antennas and a satellite. The second directions are directions between an antenna and such elements. When the vessel turns, rolls, yaws and/or pitches, the direction between the antenna and the satellite may vary, in a coordinate system of the vessel, where the second directions, in that coordinate system, may be constant. This first direction is determined in all tracking antennas for communication with a satellite and for use on vessels. This technology is known to the skilled person.

In other situations, the antennas and such object or obstacles are not provided on the same element or platform, whereby the second directions are determined in any desired manner, such as from information from the platforms holding the obstacles and the antenna(s).

In one embodiment, the controller comprises information relating to a position of each of a plurality of signal providers and is operable to re-direct one of the first and second antenna, such as when these are tracking antennas, from a first signal provider to a second signal provider, while the signal converter of the pertaining tracking antenna outputs a signal not with the predetermined characteristic.

This may be the situation where communication is performed with the first signal provider but the quality thereof, such as the signal strength or a signal quality, is deteriorating. Then, the controller may operate the antenna which outputs a signal not with the predetermiend characteristic, to redirect to the second signal provider. Even though the second antenna outputs a signal not with the predetermined characteristic, the antenna may itself communicate with the signal provider. This communication may be used for tracking the second signal provider and determine a quality/strength of the quality or data before shifting the signal converter of the second antenna to the mode in which it outputs the output signal with the predetermined characteristic.

The controller may opt to, while having the signal converter of the first antenna output the signal with the predetermined characteristic, re-direct the other antenna to a series of signal providers in order to determine which one to communicate with. Thus, when directed toward a signal provider, the second antenna may forward information, such as the signal strength indication, to the controller even though its signal converter outputs a signal not with the predetermined characteristic.

In one situation, the assembly is for use on a vessel. The bridge may forward information to the controller relating to a heading or intended heading of the vessel. The controller may then determine that an angle toward the first signal provider or a distance thereto is becoming unsuitable, whereby the step of re-directing the second antenna may be initiated. In addition, the controller may comprise information relating to directions toward or positions of the second signal provider or a number of second signal providers and select the second signal provider and then control the second antenna to redirect.

In a particularly interesting embodiment, the first antenna further comprises a first directional element and a first moving element configured to alter a direction of the first directional element, the first antenna further comprising a tracking controller configured to receive the signal from the first signal generator and control the moving element accordingly.

This directional element may be a movable element defining an optimal direction of an incoming wireless signal to be received. Widely used satellite receivers use a disc, which is used for collecting and directing incident radiation on a receiver—the signal generator. This disc and the receiver together define an optimal direction toward the signal provider or source, such as a satellite. In order to be able to track this source, when either it or the assembly moves, the disc and/or receiver must be movable. When moving one or both of these elements, the optimum direction is re-directed.

The tracking controller receives the signal from the signal generator and tracks the signal source so as to maintain the direction toward the signal source.

This is standard tracking, but it is noted that the tracking controller receives the signal from the signal receiver. Thus, the tracking controller receives the signal independently of the mode of the signal converter and the characteristics of the output signal. This antenna is able to track the signal source even in the situation described below, where no signal is output from the antenna.

Another interesting situation is one where tracking is not possible due to a deterioration of signal strength. In this connection, the tracking controller may receive information relating to a position and heading of the assembly, such as from a bridge on a vessel, so that a direction may be calculated at least roughly so that when the signal quality increases, the direction already is obtained.

In a particularly simple embodiment, the first signal converter comprises a first on/off switch and the second signal converter comprises a second on/off switch, each on/off switch being configured to operate in two distinct modes, where, in a first mode, signal transmission is allowed between the pertaining signal generator and the pertaining signal output, and in a second mode, signal transmission is prevented, the assembly further comprising a switch controller configured to control the first and second on/off switches so that no more than one of the first and second on/off switches is in the first mode.

An on/off switch may be a circuit breaker, a relay or the like or a circuit operable to receive the signal from the signal generator and output the signal or not depending on which mode the circuit is operated in.

Then, one characteristic is an on mode where the signal has a non-zero amplitude or an amplitude higher than a given threshold, and an off mode where the signal has zero amplitude or at least a very low amplitude. In many circumstances, the off mode may be a mode where the signal is dampened at least 15 dB, such as 20 dB, preferably at least 25 dB compared to the signal in the on mode.

In this situation, the combining unit may simply sum the two signals, as one signal will be zero or at least very much weaker than the other. A simple electronic (e.g. for impedance matching) or galvanic connection may be used.

A second aspect of the invention relates to a method of operating the assembly of the first aspect, the method comprising:
  during a first period of time, operating the first signal converter to output the first output signal having a first characteristic of the plurality of characteristics, and the second signal converter to output the second output signal having a second of the plurality of characteristics,
  during a second period of time, operating the first signal converter to output the first output signal having a second characteristic of the plurality of characteristics, and the second signal converter to output the second output signal having a first of the plurality of characteristics,
  at a point in time after the first period of time and before the second period of time, the controller instructing the first signal converter to go from outputting the first output signal having the first characteristic to output the first output signal having the second characteristic, and instructing the second signal converter to go from outputting the second output signal having the second characteristic to output the second output signal having the first characteristic,
where the combining element constantly combines the signals received on its inputs to an output signal output on its output during the first and second periods of time and at the point in time.

Naturally, the first and second periods of time may have any time duration. The first period of time may take seconds, minutes, hours or even days, as may the second period of time.

The operation of the first antenna, which is what takes place during the first period of time, may be the most desired operation in certain instances, such as if the first antenna is new or of a better quality or in a better state than the second antenna.

The first and second periods of time may be adjacent, separated merely by the point in time of changing over the modes of the switches.

The point in time preferably has a very short duration in order to ensure that the period of time during which no signal is output by the combining element is as brief as possible. This time of change over may take less than a second, such as less than 1 ms.

In one situation, the method further comprises the step of the first signal generator determining a signal strength of a received signal and outputting a signal strength indication, wherein the controller receives the signal strength indication and operates in accordance therewith. As described above, the changing over may take place, if the signal or data strength deteriorates to a given degree.

In that situation, the first signal converter may output the signal with or without the predetermined characteristic on the basis of the signal strength indication without intervention of e.g. another antenna or an outside controller, but the other antenna and/or outside controller may be informed of the signal/data strength or the operation of the first signal converter and operate the second signal converter accordingly.

In one embodiment, the method further comprises the steps of:
  determining a first direction from the first antenna and to a predetermined signal provider, and
  comparing the first direction to one or more second directions and controlling the first signal converter on the basis of a result of the comparison.

As mentioned above, the second directions may be directions from an antenna and toward obstacles which may block the field of view of the antenna. Second directions may also be directions along which the antenna is unable to direct radiation or from which radiation may not be sufficiently well sensed or detected by the antenna. This may be due to limited movability of the antenna or constructional limitations of the antenna.

In one situation, the method further comprises the steps of:
  determining or accessing information relating to a position of each of a plurality of signal providers and
  re-directing one of the first and second antenna from one signal provider to another signal provider, while the signal converter of the pertaining antenna outputs a signal not with the predetermined characteristic.

This redirection may be performed due to a distance to one signal provider exceeding a predetermined limit, due to the signal provider approaching the horizon, or that the antenna or assembly is approaching an edge of a coverage area of the signal provider. The other signal provider may then be selected on the basis of its position, coverage area or the like.

In an interesting embodiment, the first antenna further comprises a first directional element, the method further comprising the steps of:
  controlling an operation of the first directional element independently of the characteristic of the first output signal.

Thus, the directional element may be controlled and operated no matter what characteristic is provided to the output signal.

As mentioned above, it is preferred that the signal converters are on/off switches whereby the characteristics is (at least substantially) no amplitude or non-zero amplitude. Naturally, any number of antennas may be provide outputting a zero amplitude signal (no signal) without interfering with the (non zero amplitude) signal output from the antenna outputting the signal with the predetermined characteristic (non-zero amplitude).

In another situation, the predetermined characteristic is a frequency, such as a carrier frequency, within a predetermined frequency interval, where other characteristics are frequencies within other intervals, whereby separation of the desired frequency interval also is simple.

A number of different antennas are suitable for use in the assembly according to the invention, depending on the embodiments selected.

In a first situation, a suitable antenna may comprise a signal generator, a signal output, and a tracking controller configured to receive a signal from the signal generator and to alter a directional characteristic of the antenna accordingly, the antenna further comprising an on/off switch configured to operate in two distinct modes, where, in a first mode, signal transmission is allowed from the signal output, and in a second mode, signal transmission is prevented from the signal output.

In this situation, the antenna may output no signal while the tracking controller may maintain a direction or communication to or with the signal provider.

Naturally, these antennas may have the advantages and elements/contents mentioned above, such as a mode controller for controlling the switch and/or an input for receiving instructions controlling the switch or for controlling the switch.

In one situation, antenna further comprises a signal sensor, the on/off switch being configured to:
  receive a signal from the signal sensor and a signal from the signal generator and/or the tracking controller,
  operate in the first mode, if the signal from the signal sensor fulfils a predetermined criterion and, if not
  operate in the second mode.

Again, this signal from the sensor may be output for controlling other antennas.

Another suitable antenna comprises a signal generator, a signal output, and a tracking controller configured to receive a signal from the signal generator and to alter a directional characteristic of the antenna accordingly, the antenna further comprising a signal converter configured to operate in a plurality of distinct modes, where, in a first mode, a signal from the signal generator and/or the tracking controller is converted into a signal within a first, predetermined frequency interval, and in a second mode, the signal from the signal generator and/or the tracking controller is converted into a signal within a second, predetermined frequency interval, the first and second frequency intervals being non-overlapping.

Compared to the above aspect, the characteristics now are different frequencies or frequency intervals. Again, the antenna itself is able to output signals within different frequency intervals, so that it is especially well suited for use with the simple combining unit described above.

In this situation, the antenna may further comprise a signal sensor, the signal converter being configured to:
  receive a signal from the signal sensor and a signal from the signal generator and/or the tracking controller,
  operate in the first mode, if the signal from the signal sensor fulfils a predetermined criterion and, if not
  operate in the second mode.

Yet another suitable antenna comprises a signal generator, a signal output, and a tracking controller configured to receive a signal from the signal generator and to alter a directional characteristic of the antenna accordingly, the antenna further comprising a signal sensor and a signal converter configured to:
  receive a signal from the signal sensor and a signal from the signal generator and/or the tracking controller,
  convert the signal from the signal generator and/or the tracking controller into:
  a first output signal having a first predetermined signal characteristic, if the signal from the signal sensor fulfils a predetermined criteria and, if not
  a second output signal having a second predetermined signal characteristic being different from the first signal characteristic.

Thus, the predetermined criteria may be a predetermined, quantified signal quality or signal strength from the signal sensor. This may be based on a threshold, where the criteria is a signal above or below the threshold. One of the characteristics thus may be the above predetermined characteristic, when the signal quality/strength is sufficient and, if not, one of the other characteristics.

Also, a suitable antenna may be termed a slave antenna controlled or controllable by one or more of the above antennas in that this antenna comprises a signal generator, a signal output, and a tracking controller configured to receive a signal from the signal generator and to alter a directional characteristic of the antenna accordingly, the antenna further comprising a mode select input and a signal converter, which is configured to:
  receive a signal from the mode select input and a signal from the signal generator and/or the tracking controller and
  convert the signal from the signal generator and/or the tracking controller into:
  a first output signal having a first signal characteristic, if the signal from the mode select input fulfils a predetermined criteria and, if not
  a second output signal having a second signal characteristic being different from the first signal characteristic.

This antenna may be controlled by a signal received on the mode select input. The criteria of this signal is a simple protocol question in that the signal converter is able to see, from the signal receive, which mode to operate in.

In the following, preferred embodiments of the invention will be described with reference to the drawing wherein:
  FIG. 1 illustrates a vessel with antennas communicating with a satellite,
  FIG. 2 illustrates the vessel of FIG. 1 from above, and
  FIG. 3 is a block diagram of an embodiment according to the invention.

Figure 2:
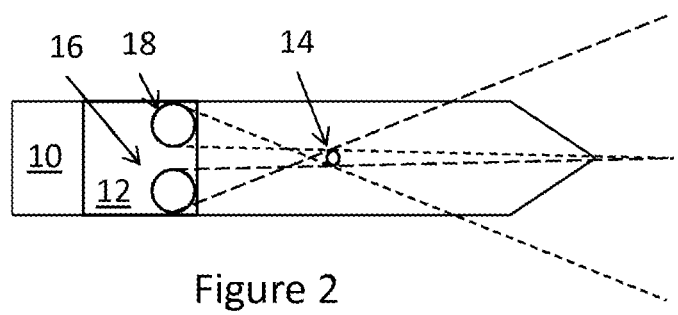
Figure 3:
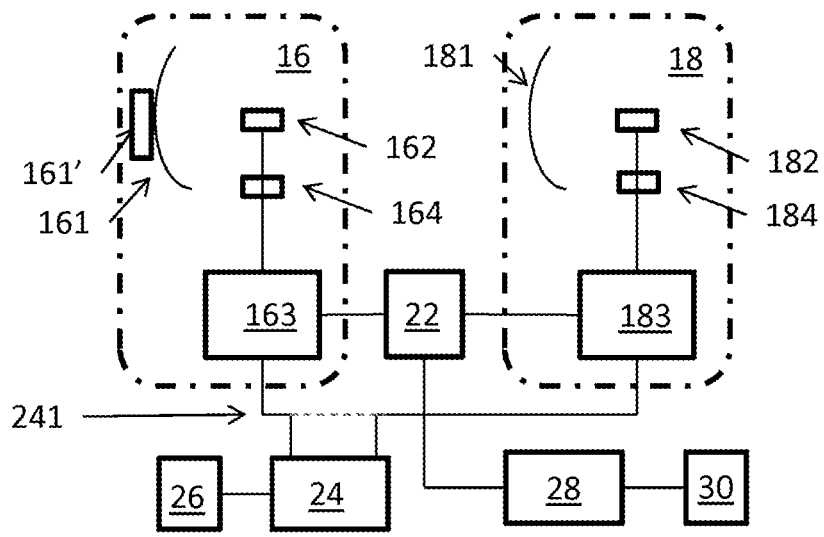

In FIGS. 1 and 2, a vessel 10 is seen from the side and from above having a cabin or housing 12 on top of which is positioned two antennas 16 and 18, and which has a mast or crane 14 with a height where it may block the line of sight between an antenna 16/18 and a satellite 20.

Naturally, the satellite 20 could be replaced by an antenna of another vessel, a plane, a vehicle or the like, or a land-based antenna.

From FIG. 2, the fields of view of the two antennas 16/18 are illustrated from which it is seen that the mast 14 creates shadows blocking the field of view of the antennas 16/18.

Thus, a reason for providing two antennas 16/18, apart from the obvious desire to have a redundant antenna, should one fail, is to be able to communicate with the satellite 20 with one antenna 16, while the satellite 20 is in the shadow of the mast 14 of the other antenna 18.

In FIG. 3, an assembly according to the invention is illustrated as a block diagram with the antennas 16 and 18 each comprising a reflector disc 161/181 respectively and a sensor/detector/LNB (Low Noise Block) 162/182 respectively. In addition, each antenna 16/18 has a switch 163/183 receiving the signal from the LNB 162/182 and having outputs connected to a combining element 22 feeding the combined signal to a filter/decoder 28 outputting data to a receiver 30, which may be a computer or the like.

In addition, the antennas may have have tracking controllers 164/184 which receive signals from the respective LNB and which feeds the received signal to the switch. Alternatively, the signal may be fed directly from the LNB to the switch.

The tracking controllers are active to track a source of the signal received by the LNB, such as by redirecting, using the motor (linear, stepper, electric hydraulic, or the like) 161', the disc or another physical directioning element of the antenna and/or altering a phase between signals of different antenna. This tracking may be made on the basis of a quality or strength of the signal output of the LNB, and the tracking may be the performing of small deviations of the disc, phase or the like. Alternatively, the tracking controller may be able to, from the signal from the LNB, determine a direction of tracking in order to optimize or increase the direction and signal quality/strength.

It is noted that a transmit signal may be fed from the element 30 through the filter/decoder which may also be a coding element or an element adding the data or signals received on to a selected carrier frequency, and the signal output from the element 28 may be fed to the combiner 22 which may also be a splitter feeding the signal to each of the antennas 16/18 from which the signal may be transmitted.

The switches 163/183 are controlled by a controller 24 which may receive position/heading information or other information from a computer or controller 26, which may be connected to a bridge of the vessel 10, such as a GPS thereof, in order to determine or know a position or heading of the vessel 10.

The switches may be operated in each of two modes where, in a first mode, a signal from the LNB 162/182 is allowed to travel through the switch to the combining element 22 and, in a second mode, the signal from the LNB is prevented from reaching the output. It is noted that the operation of the switch does not interfere with the operation of the tracking controllers, so that the antenna may keep tracking even when not outputting a signal.

The controller operates or controls the switches so that only one of the switches 163/183 is in the first mode, so that only one of the switches outputs a signal. In that manner, the combining means 22 may be very simple in that it does not receive conflicting or interfering signals. Then, the combining means may be a simple galvanic or electric connection between sets of a conductor of each input and a conductor of the output. The two signals are combined instead of having to block one signal to allow the other to be output.

Naturally, the communication between the controller 24 and the switches 163/183 or antennas 16/18 may comprise further information. The antenna may further comprise a signal sensor, which may be part of the tracking controller, which is adapted to feed information to the controller relating to a quality/strength of a signal received or of data derived from a received signal. The controller may use this information to determine from which of the antennas the signal is to be received. If the signal quality/strength of one antenna deteriorates, such as due to the satellite moving into the shadow of the mast, the controller may operate the switches so that the other antenna is allowed to feed the signal to the combining element.

This signal quality/strength determined by the signal sensor may also be used in a local controller which may form part of the switch 163/183 and which operates the switch in accordance with the signal strength/quality determined.

These local controllers may interact directly and not via the controller 24, as is indicated by the hatched line 241. Then, the controller 24 and computer 26 may not be needed.

The controller in the switch 163/183 may then, on the basis of the sensed quality/strength, determine whether the pertaining antenna is suitable for receiving the signal and outputting the signal. If so, it may inform the other antenna thereof in order for the other antenna to not output the signal. Alternatively, one antenna may inform the other in the situation where the signal strength/quality deteriorates to a certain degree, so that the other antenna may start outputting its signal, in the expectation that that antenna has a better signal strength/quality.

Preferably, both antennas are identical so that the controller in the switch 163/183 may both control the other antenna and be controlled by the other antenna.

In fact, the above decision to take or give away the control or the outputting of signal may be made alternatively or additionally on the basis of an angle or direction from the antenna and to the source of the signal received, compared to predetermined directions from the antenna to shadowing elements. If the direction between the antenna and the source approaches that between the antenna and an obstacle, the antenna may instruct the other antenna to take over the outputting of the signal in order to pre-empt a signal degradation caused by the obstacle.

In another embodiment, the switches 163/183 are replaced by frequency converters which are adapted to operate in two distinct modes of which a first mode is a conversion of the signal received from the LNB into a first frequency interval and the second mode is a conversion of the signal into a second frequency interval, where the first and second frequency intervals are non-overlapping.

In this situation, the combiner 22 may be able to combine the two incoming signals by simple summation, so that the signal output comprises both the input signals. The combiner 22 may then have an output filter passing the signal within one of the frequency intervals but not the other, or the filter/decoder 28 may have a filter of that type.

In that situation, the overall functionality of the assembly may be as that described for on/off switches, as one frequency interval is passed by the filter and thus output of the combiner 22 or allowed by the filter/decoder 28, while the other is not. The antennas may then shift between these modes in the same manner and for the same reasons as described further above.

A number of different manners of operation are possible in the present system.

In one situation, the antennas 16/18 both are directed toward the same satellite 20. The controller 24 receives heading information or position information from the computer 26. The controller may also receive information that the heading will change. Then, it may be determined that the satellite 20 will move into the shadow relating to the antenna 16/18 currently feeding its signal to the combining element 22. The controller may then operate the switches to allow the other antenna to feed its signal to the combining element 22.

In another situation, one antenna is communicating with one satellite 20, but the signal or data quality may be deteriorating due to the satellite approaching the horizon, or the vessel 10 approaching an edge of the coverage of the satellite 20. The controller 24 may then instruct the other antenna to start communicating with another satellite being farther from the horizon, closer to the vessel 10 and/or the coverage of which the vessel 10 is within or approaching. When the communication with the other satellite has been set up, the controller may operate the switches so that the communication now is performed with the new satellite. Then, the other antenna may be instructed to also target the new satellite so as to operate as a redundant antenna for that satellite.

The selection of the other antenna may be made by the controller 24 or the computer 26. Even though the determination may be made by having the other antenna search the sky for a satellite with a suitable signal/data quality, usually, the satellite will be determined on the basis of the position and/or heading of the vessel 10, as the positions of the satellites 20 are known.

Naturally, the tracking performed by the antennas 16/18, in the illustrated version where the discs and LNBs are rotated to target the satellite, may be altered using stationary antennas with multiple receiving/transmitting elements where the tracking may be performed by feeding, to the individual receiving/transmitting elements, signals with different phases. As the skilled person knows, a phase shift will direct the outgoing radiation in a given direction, and a phase shift of received signals will put an emphasis on signals received from a given direction.

The invention claimed is:

1. An assembly comprising:
   a first antenna including a first signal generator, a first signal output and a first signal converter configured to receive a signal from the first signal generator and output a first output signal to the first signal output, the first output signal having a first characteristic of a plurality of distinct characteristics;
   a second antenna including a second signal generator, a second signal output and a second signal converter configured to receive a signal from the second signal generator and output a second output signal to the second signal output, the second output signal having a second characteristic of the plurality of distinct characteristics, the second characteristic being different from the first characteristic;
   a mode controller configured to control the first and second signal converters so that no more than one of the first and second output signals has a predetermined characteristic of the plurality of distinct characteristics; and
   a combining unit including a first signal input, a second signal input and a third signal output, the first signal input and the second signal input being connected to the first signal output and the second signal output, respectively, wherein
   the first signal input, the second signal input, and the third signal output each include one or more electrical conductors, and
   the combining unit includes connecting conductors, each of the connecting conductors configured to electrically connect one of the one or more electrical conductors of the first signal input, one of the one or more electrical conductors of the second signal input and one of the one or more electrical conductors of the third signal output.

2. The assembly according to claim 1, wherein the first antenna includes an element configured to receive the signal from the first signal generator and to determine a signal strength or a signal quality of the signal received by the first signal generator, the element having a strength output configured to output a signal strength indication.

3. The assembly according to claim 2, wherein the mode controller is further configured to receive the signal strength indication from the strength output and control the first and second signal converters accordingly.

4. The assembly according to claim 1, further comprising:
   a direction element operable to determine a first direction from the first antenna to a predetermined signalling device, wherein
   the direction element includes information relating to one or more second directions and is operable to compare the first and second directions and to output direction information to the mode controller, which is configured to control the first signal converter on the basis of a result of the comparison.

5. The assembly according to claim 1, wherein the first antenna further comprises:
   a first directional element and a first moving element configured to alter a direction of the first directional element; and
   a tracking controller configured to receive the signal from the first signal generator and control the moving element accordingly.

6. The assembly according claim 1, wherein
   the first signal converter includes a first on/off switch and the second signal converter includes a second on/off switch, each on/off switch being configured to operate in two distinct modes, where, in a first mode, signal transmission is allowed between the pertaining signal generator and the pertaining signal output, and in a second mode, the signal transmission is prevented, and
   the assembly further includes a switch controller configured to control the first and second on/off switches so that no more than one of the first and second on/off switches is in the first mode.

7. A method of operating an assembly, the assembly including a first antenna, a second antenna, a mode controller and a combining unit, the first antenna including a first signal generator, a first signal output and a first signal converter configured to receive a signal from the first signal generator and output a first output signal to the first signal output, the first output signal having a first characteristic of a plurality of distinct characteristics, the second antenna including a second signal generator, a second signal output and a second signal converter configured to receive a signal from the second signal generator and output a second output signal to the second signal output, the second output signal having a second characteristic of the plurality of distinct characteristics, the second characteristic being different from the first characteristic, the mode controller configured to control the first and second signal converters so that no more than one of the first and second output signals has a predetermined characteristic of the plurality of distinct characteristics, and the combining unit including a first signal input, a second signal input and a third signal output, the first signal input and the second signal input being connected to the first signal output and the second signal output, respectively, the method comprising:
  during a first period of time, operating the first signal converter to output the first output signal having the first characteristic of the plurality of distinct characteristics, and the second signal converter to output the second output signal having the second characteristic of the plurality of distinct characteristics;
  during a second period of time, operating the first signal converter to output the first output signal having the second characteristic of the plurality of distinct characteristics, and the second signal converter to output the second output signal having the first characteristic of the plurality of distinct characteristics;
  at a point in time after the first period of time and before the second period of time, instructing, via the mode controller, the first signal converter to go from outputting the first output signal having the first characteristic to output the first output signal having the second characteristic, and instructing the second signal converter to go from outputting the second output signal having the second characteristic to output the second output signal having the first characteristic; and
  constantly combining, via the combining unit, the signals received on the first and second signal inputs to the third output signal output on the third signal output during the first and second periods of time and at the point in time.

8. The method according to claim 7, further comprising:
determining a signal strength of a signal received by the first or second signal generator and outputting a signal strength indication, wherein
  the mode controller is configured to receive the signal strength indication and operate in accordance therewith.

9. The method according to claim 7, further comprising:
determining a first direction from the first antenna to a predetermined signalling device, and
comparing the first direction to one or more second directions and controlling the first signal converter on the basis of a result of the comparison.

10. The method according to claim 7, wherein the first antenna further includes a first directional element, the method further comprising:
  controlling an operation of the first directional element independently of the characteristic of the first output signal.

* * * * *